United States Patent [19]
Gaines et al.

[11] 3,715,639
[45] Feb. 6, 1973

[54] ELECTRICAL APPARATUS CONTAINING DIELECTRIC SOLUTION

[75] Inventors: George L. Gaines, Scotia; Donald G. LeGrand, Burnt Hills, both of N.Y.

[73] Assignee: General Electric Company

[22] Filed: Feb. 16, 1972

[21] Appl. No.: 226,948

Related U.S. Application Data

[62] Division of Ser. No. 839,642, July 7, 1969.

[52] U.S. Cl. .................. 317/258, 174/8, 317/259
[51] Int. Cl. ......................................... H01g 3/04
[58] Field of Search .......... 317/258, 259; 252/64, 66; 174/8

[56] References Cited

UNITED STATES PATENTS 3,363,156  1/1968  Cox .................................... 317/258
3,483,452  12/1969  Thigpen ............................. 317/258

Primary Examiner—E. A. Goldberg
Attorney—Charles T. Watts et al.

[57] ABSTRACT

An electrical apparatus containing a dielectric solution with good wetting properties is disclosed as well as an electrical capacitor assembly containing dielectric material comprised of a polyolefin impregnated with the dielectric solution. The solution is comprised of a dielectric liquid and a block copolymer additive which is surface-active therein. The block copolymer is comprised of at least two polymerized comonomers, one of which is soluble in the dielectric liquid thereby distributing the block copolymer therein, and the second of which is sufficiently surface-active in the solution to produce a solution having a surface tension less than that of the dielectric liquid alone.

6 Claims, 3 Drawing Figures

CAPACITOR UNIT CONTAINING DIELECTRIC SOLUTION WITH WETTING ADDITIVE

PATENTED FEB 6 1973 3,715,639

CAPACITOR UNIT
CONTAINING DIELECTRIC SOLUTION 23
WITH WETTING ADDITIVE

ELECTRICAL APPARATUS CONTAINING DIELECTRIC SOLUTION

This is a division of U.S. Pat. application Ser. No. 839,642, filed July 7, 1969.

The present invention relates to dielectric materials. More specifically, it relates to a dielectric solution for electrical apparatus such as capacitors. It also relates to dielectric materials comprising a polymer ordinarily in the form of a film, impregnated with the present dielectric solution.

Halogenated aromatic compounds, known as askarels in the industry, and specifically chlorinated diphenyl and related compounds, are widely used as dielectric media in electrical apparatus such as electrical transformers for cooling and insulating purposes, these compounds having the advantage over mineral oil dielectrics of being non-flammable.

Since many of the electrical characteristics of a dielectric are a result of surface phenomena, it is desirable that a liquid halogenated aromatic dielectric with low surface tension be employed. The lower the surface tension of the dielectric, the greater is its wetting of the electrical components to give better cooling, impregnation, and greater voltage-gradient uniformity. There are, however, a number of disadvantages inherent in the use of wetting agents in liquid halogenated aromatic dielectrics. One such disadvantage is the high incompatibility or insolubility of most wetting agents in dielectrics, so that any distribution thereof in the liquid is a transient condition with the agent soon separating out and concentrating in isolated areas of the surface of the liquid. In such condition, it does not increase the dielectric's wetting properties. Silicone oil, for example, has a low surface tension but when it is admixed with a liquid halogenated aromatic dielectric, it quickly separates out as a separate phase due to the incompatibility of the materials and is not effective in reducing the surface tension of the liquid. Another disadvantage of a number of wetting agents is that they volatilize or decompose under usual conditions of use of the dielectric. Such another disadvantage is that some wetting agents tend to deteriorate the dielectric properties of the liquid.

It is an object of the present invention to produce a halogenated aromatic dielectric solution having substantially uniform low surface tension and increased wetting properties which are attained without significantly diminishing the dielectric properties of the liquid.

Briefly stated, the process of the present invention comprises substantially dissolving a surface-active block copolymer additive in a halogenated aromatic dielectric liquid to produce a solution having a surface tension less than that of the dielectric liquid alone, i.e. at least two dynes per centimeter less. The block copolymer additive contains at least two polymerized comonomers. One of the polymerized comonomer components is soluble in the dielectric liquid and serves to distribute the additive in the liquid. The second polymerized comonomer component is sufficiently surface-active in the dielectric liquid to produce a solution having a surface tension less than that of the dielectric liquid alone.

A preferred halogenated aromatic dielectric liquid according to our invention, is a compound having from one to five halogen substituents such as chlorine, and from one to three aryl groups. More specifically, a preferred liquid is trichlorodiphenyl which is commercially available as Pyranol 1499. This material has a high corona start and corona extinction voltage.

As used herein, the term "surface-active block copolymer additive" means one which when dissolved in the halogenated aromatic dielectric liquid depresses the surface tension of the liquid.

The block copolymer additive contains at least two polymerized comonomers. One of the polymerized comonomer components is soluble in the dielectric liquid so that it serves to distribute the additive in the liquid. An example of such a polymerized comonomer is polycarbonate for a dielectric such as trichlorodiphenyl. The second polymerized comonomer component is sufficiently surface-active in the dielectric liquid solution so that the solution has a surface tension less than that of the dielectric liquid alone. Typical examples of such surface activity-imparting comonomers are organosiloxanes such as dimethylsiloxane, and fluoro-containing monomers such as pentadecafluoro-octyl methacrylate and 2-(N-propylperfluoro-octane sulfonamido) ethyl acrylate. Specifically, polycarbonate-polydimethylsiloxane block copolymers polystyrene-polydimethylsiloxane block copolymers, and polyphenylene oxide-polydimethylsiloxane block copolymers are suitable as additives for a dielectric liquid such as trichlorodiphenyl to form the solutions of the present invention.

The block copolymer additive used in the present invention can vary in composition and structure. It may be a graft, branched, or linear block copolymer. Since it is a block copolymer, it contains repeating segments or blocks of the same monomeric unit and these blocks have a length close to the average block length for that particular monomer. However, the average block length of one comonomer component can differ from the average block length of a second comonomer component and such differing average block lengths largely determine the properties of the resulting block copolymer.

An example of a linear block copolymer of A and B monomeric units may have the following structure:

...AAAAABBBAAAABBBBAAAAAABB... where the A block has an average of five units and the B block average three units. An example of a graft block copolymer of A and B monomeric units may have the following structure:

As is well known in the art, such block copolymers are distinguishable from random copolymers which do not contain substantially uniform blocks, e.g. copolymers which on the average contain no particular repeating sequence of the same monomeric units and which may have combinations of units varying widely in length and dispersion (e.g., ABAAAABABBAABBBABAB...).

Random copolymers, therefore, are not useful in the present invention since, as a practical matter, they cannot be prepared to have the predetermined essential properties of the present block copolymers.

A block copolymer additive of the present invention can be prepared by a number of conventional techniques. It should be prepared, however, so that it is sufficiently soluble in the dielectric liquid that it does not significantly diminish dielectric properties and also is sufficiently surface-active in the solution to depress surface tension. In most instances, the polymerized comonomer component of the block copolymer additive which is soluble in the dielectric liquid and thus promotes distribution of the additive therein should have an average block length of at least three monomer units, and the polymerized comonomer component of the additive which provides the desired surface-activity should have an average block length of at least five monomer units. The maximum average block length of each comonomer component is determinable empirically, i.e. it depends largely on the amount of the block copolymer additive used with a particular dielectric liquid.

The number average molecular weight of the block copolymer additive can vary over a wide range as long as the additive is substantially soluble in the dielectric liquid and is sufficiently surface-active therein, i.e., it should not be so high as to make the additive substantially insoluble in the dielectric. However, it should not be so low as to volatilize during operation.

The amount of the block copolymer additive used may be determined empirically and depends largely on its solubility and the decrease in surface tension it effects in the dielectric liquid. However, the block copolymer additive should not be used in an amount which would leave sufficient insoluble residue to significantly deteriorate the dielectric properties of the halogenated aromatic liquid. The greater the amount of surface-active component in the block copolymer additive, the less soluble is the additive in the dielectric liquid. Generally, the block copolymer additive should be used in an amount less than one percent by weight of the liquid because amounts in excess of one percent might alter its dielectric properties although more than one percent of the block copolymer can be used if it is sufficiently soluble in the dielectric. On the other hand, a particular block copolymer additive should not be used in an amount so small that the additive cannot get to the surface because of its small diffusion rate.

The solution of the present invention is particularly useful as dielectric media in electrical apparatus such as electrical capacitors for cooling and insulating purposes. The use of a halogenated aromatic dielectric liquid in a capacitor is disclosed in U.S. Pat. No. 3,242,402 assigned to the same assignee as the present invention and incorporated herein by reference. If desired, mixtures of the present halogenated aromatic dielectric solution may be used as well as mixtures of the halogenated dielectric solution or solutions with mineral oil, silicone oil, etc.

In U.S. Pat. No. 3,363,156, assigned to the same assignee as the present invention and incorporated herein by reference, there is disclosed a dielectric material comprised of a polyolefin impregnated with a halogenated aromatic dielectric compound. One such material is polypropylene film impregnated with trichlorodiphenyl sold under the trademark Pyranol 1499 and disclosed as a useful dielectric in capacitors. The patent also discloses that such impregnated polyolefins are useful for many electrical applications including insulated electrical devices generally, such as electrical cable and transformers.

Specifically, the patent discloses the solid polyolefin resin dielectric material as having numerous minute discontinuities otherwise characterized as apertures, voids, and interstices, whose presence is a recognized characteristic of the resin. This material is described as non-porous in that there are few if any pores or passages interconnecting and passing through side surfaces which would permit the movement of an impregnant fluid through opposite side surfaces. The patent teaches that the polyolefin resin material is impregnated with a dielectric liquid impregnant which permeates the material itself as well as filling these discontinuities, and the composite constitutes a continuous, though heterogeneous, dielectric system. Surprisingly, the kind of impregnation obtained by these teachings in combination with specific materials leads to a kind of synergistic effect the result of which increases the dielectric strength of the combination. In one respect impregnation increases the electrical insulating qualities of the resin dielectric by incorporating in the resin an impregnant material having a higher dielectric strength than the air or gas in the described discontinuities.

One embodiment of the present invention is a dielectric material as disclosed in U.S. Pat. No. 3,363,156 except that the impregnating liquid is the dielectric solution of the present invention.

In this respect the use of the dielectric material of the present invention can be better understood from the following description taken in combination with the accompanying drawings as set forth in U.S. Pat. No. 3,363,156 in which.

Figure 1:
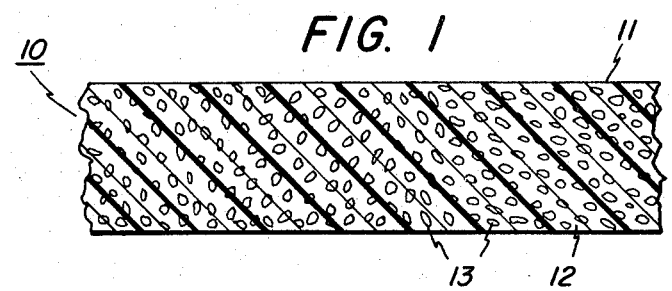
FIG. 1 is an enlarged cross sectional view of a portion of an essentially completely impregnated resinous dielectric spacer.

Referring now to FIG. 1, there is illustrated one preferred dielectric spacer embodiment 10 of this invention including a section of a solid polyolefin resin dielectric material 11 having numerous minute discontinuities 12 otherwise characterized as apertures, voids, and interstices, whose presence is a recognized characteristic of the resin. This material is described as non-porous in that there are few if any pores or passages interconnecting and passing through side surfaces which would permit the movement of an impregnant fluid of this invention through opposite side surfaces. The polyolefin resin material is impregnated with a dielectric liquid impregnant which permeates the material itself as well as filling these discontinuities, and the composite constitutes a continuous, though heterogeneous, dielectric system.

Figure 2:
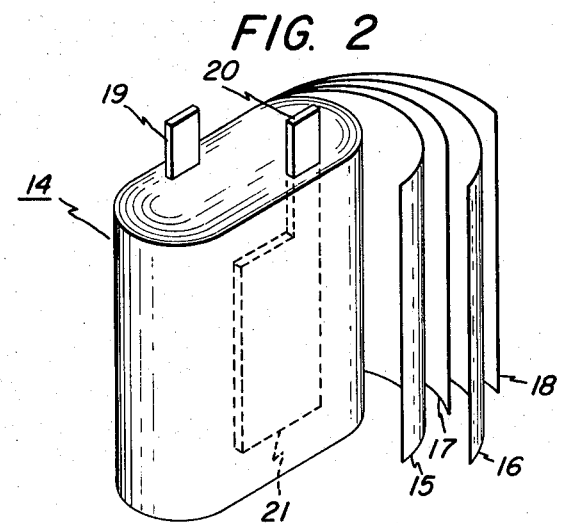
FIG. 2 is a perspective view of a partially uncoiled convolutely wound capacitor.
Figure 3:
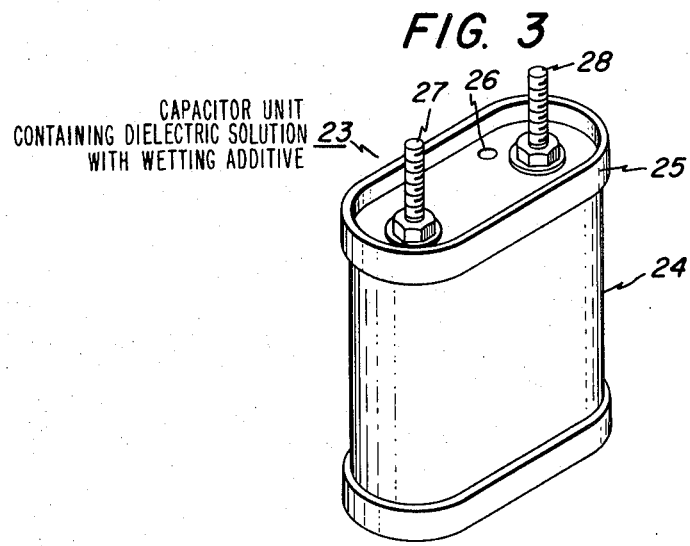
FIG. 3 shows a full assembled capacitor which includes a capacitor of the type shown in FIG. 2 and a container therefor.

Capacitor devices embodying the present invention, such as those illustrated in FIGS. 2 and 3, may have the same general configuration of presently known capacitors. Referring now to FIG. 2, there is shown a convolutely wound capacitor 14 comprising separate electrode foils or armatures 15 and 16, and intermediate dielectric spacers 17 and 18. Terminal connectors 19 and 20 have enlarged surfaces 21 and 22 (not shown) in contact with electrode foils 15 and 16. Electrode foils 15 and 16 may comprise one or more of a number of different materials, generally metallic, including for example aluminum, copper and tantalum. Dielectric spacers 17 and 18 generally comprise a composite or sandwich type structure which includes at least one impregnated resinous layer 11 in accordance with the present invention. More specifically, a dielectric spacer 17 and the metallic electrode foils 15 and 16, taken together, comprise a capacitor element structure.

Referring now to FIG. 3, there is shown an assembled capacitor unit 23 in which is encased a convolutely wound capacitor of the type shown in FIG. 2. The assembled unit also includes a container 24, a hermetically sealed cover 25, which includes a small dielectric liquid fill hole 26, and a pair of terminals 27 and 28, projecting through cover 25 and insulated therefrom. Within the container 24, terminals 27 and 28 are connected to terminal connectors 19 and 20, as shown in FIG. 2. Although not illustrated, the unit 23 shown in FIG. 3 further includes a dielectric liquid which occupies the remaining space in container 24 not occupied by the capacitor element, and which also impregnates the dielectric spacers 17 and 18 shown in FIG. 2.

In one general impregnation method, capacitor units or encased assemblies such as capacitor 23, FIG. 3, of the present invention, are usually vacuum dried to remove residual moisture. The drying temperature will vary depending on the length of the drying cycle, but usually ranges from about 60° to 150° C. With too low a temperature the drying speed is excessively long while too high a temperature may cause decomposition of any paper component of the dielectric spacer. Hole 26 permits withdrawal of moisture from the interior of container or housing 24 during the drying process.

The impregnating dielectric liquid is admitted to the capacitor assembly through hole 26 preferably while the dried assembly is still under vacuum in a suitable evacuated enclosure. Usually, enough of the impregnating liquid is introduced to at least submerge the capacitor element in the container. The pressure in the enclosure is then raised to atmospheric pressure and the assembly permitted to stand or soak for a number of hours for thorough penetration of the liquid impregnant. After impregnation, the capacitor unit may be sealed by applying a quantity of a suitable solder to hole 26.

We have found that the present solution, for example a solution of Pyranol 1499 and a proper block copolymer additive, has wetting properties superior to that of Pyranol 1499 alone. The present solution, therefore, would permeate a film of the polyolefin faster and more completely. Such ease of permeation is especially important in capacitors utilizing tightly-wound rolls. It is also important in that the impregnant can reach heretofore difficult to reach voids and interstices in remote areas from origin of impregnation.

In carrying out the process of the present invention, the polyolefin can be impregnated by a number of conventional techniques. Prior to impregnation, the polyolefin is preferably shaped by a conventional process into a desired form which depends on its final application and generally it is in the shape of a film. There is a relationship between the kind and degree of impregnation and the dielectric properties of the impregnated polyolefin material. When the voids and interstices of the polyolefin are essentially filled with impregnating solution and the impregnation process includes both adsorption of the impregnant solution by the polyolefin itself as well as partial solution of the polyolefin in the impregnating solution, the polyolefin is referred to as essentially or completely impregnated. It is this essentially completely impregnated material which is preferred in the present invention because it possesses the most satisfactory dielectric properties.

As disclosed in U.S. Pat. No. 3,363,156, polyolefins, and particularly polypropylene, may be impregnated to an unexpectedly high degree with halogenated aromatic liquids, and when so impregnated these elements combine and coact to provide an improved dielectric spacer. A preferred material of this class of polyolefins is polypropylene resin, particularly an isotactic biaxially oriented polypropylene film, a more complete description of one example of which may be found in Applied Plastics, November 1961, pp. 35 through 64, and Modern Dielectric Materials, J.B. Birks, London Heywood and Co., 1960, pp. 140–142, incorporated by reference herewith.

The polyolefin material of the mentioned articles may be described as linear, regular head to tail polymers of unsaturated hydrocarbons of the formula $CH_2=CHR$, i.e., alpha olefins, where R is a saturated aliphatic, an alicyclic, or an aromatic radical, copolymers of said unsaturated hydrocarbons with one another, and copolymers of the unsaturated hydrocarbons with at least one other monomer copolymerizable therewith.

The invention may also be practiced effectively with other members of the polyolefin family of materials, particularly polyethylene and poly-4-methyl pentene-1. For more specialized applications other combinations may include impregnated crosslinked polyethylene, or paper materials impregnated with the polyolefin of this invention, for example a paper impregnated with a melt or solution containing polypropylene with the resultant material impregnated with a solution of Pyranol dielectric and a polycarbonate-polydimethylsiloxane block copolymer additive.

The impregnated material of the present invention is useful as dielectric media in capacitors and for many electrical applications including insulated electrical devices generally, i.e. all the uses set forth in U.S. Pat. No. 3,363,156.

All parts and percentages used herein are by weight unless otherwise noted.

The invention is further illustrated by the following examples.

In the following examples the tests and materials used were as follows:

Surface tension was measured with a duNouy tensiometer ring. The surface tension is approximate due to the high viscosity of the liquids.

The contact angle between a drop of liquid and a plane solid surface is one method of measuring wettability. When the contact angle is zero the liquid is considered to wet the solid completely. The contact angle increases with decreasing wettability, and on a solid having a uniform surface, the contact angle is independent of the volume of the drop. In measuring contact angles, it is noted that there is a difference between the contact angle observed when a liquid boundary advances for the first time over a dry, clean, smooth surface and the contact angle observed when the liquid boundary recedes from the previously wetted surface. It is the advancing contact angle measured herein and this advancing contact angle was determined by profile view measurements of the contact angle between the drop of liquid and the film surface using a protractor on an eyepiece fitted to a low-power telescope. The film surface was extruded polypropylene sheet sold under the trademark Profax 6520.

The polycarbonate-polydimethylsiloxane block copolymer was prepared substantially as set forth in U.S. Pat. No. 3,189,662. The polycarbonate was the intercondensation product of 2,2-bis(4-hydroxyphenyl) propane and phosgene.

The particular composition and average block length of the block copolymer was determined by the method of preparation and by nuclear magnetic resonance spectroscopy.

Example 1

In this example two dielectric solutions of the present invention were prepared and their properties determined and compared to that of the dielectric liquid alone.

One dielectric solution of the present invention was prepared by admixing a polycarbonate-polydimethylsiloxane block copolymer with trichlorodiphenyl, sold under the trademark Pyranol 1499, at room temperature to give a solution containing a 1.1 milligrams of the block copolymer per milliliter of solution, and it is labeled solution A in the following table. The block copolymer had a number average molecular weight of 53,300 and was comprised of 75 percent by weight polycarbonate having an average block length of 18.5 monomer units and 25 percent by weight polydimethylsiloxane having an average block length of 20 monomer units.

The second dielectric solution of the present invention was prepared at room temperature by admixing Pyranol 1499 with another polycarbonate-polydimethylsiloxane block copolymer to give a solution containing 0.8 milligram of the block copolymer per milliliter of solution and it is labeled Solution B in the following table. The block copolymer of Solution B had a number average molecular weight of 72,000 and was comprised of 46 percent by weight polycarbonate having an average block length of 7.08 monomer units and 54 percent by weight polydimethylsiloxane having an average block length of 20 monomer units.

The surface tension and advancing contact angle of each of the solutions was determined as well as that of Pyranol 1499 alone and the results are shown in the following table.

| | Composition | Approximate Surface tension dynes/cm. | Advancing Contact Angle |
|---|---|---|---|
| Control | Pyranol 1499 | 43.5 | 53° |
| Solution A | 1.1 mg/ml solution of Pyranol 1499 and block copolymer | 26.6 | 20° |
| Solution B | 0.8 mg/ml solution of Pyranol 1499 and block copolymer | 24.7 | 13° |

The above table illustrates the significantly lower surface tension of the solutions of the present invention as compared to that of the dielectric liquid, Pyranol 1499, alone. Since these solutions have such a small amount of block copolymer dissolved therein, their dielectric properties are not significantly affected.

The improved wetting properties of the solutions of the present invention are illustrated by their advancing contact angles in the above table which are significantly lower than that of the Pyranol 1499 alone.

EXAMPLE 2

In this example extruded polypropylene sheet sold under the trademark Profax 6520 was used.

A drop of Pyranol 1499 was placed on a surface of the sheet and spread with a glass rod. It was observed that the Pyranol 1499 tried to reform the drop because of its non-wetting characteristics. The same test was carried out with Solution A and Solution B of Example 1. Each of these solutions remained spread out as a thin film which indicates that their wetting properties are not only greater than that of Pyranol 1499 alone but also that these wetting properties are substantially uniform.

EXAMPLE 3

In this example, the dielectric properties of two dielectric solutions of the present invention were determined and compared to those of the dielectric liquid alone.

Three standard electric cells were used and are herein referred to as Cells A, B and C. Cell A had a capacitance of 29.5182 picofarads and a cell constant, K($A/T$), of 324.7. Cell A was filled with Pyranol 1499 alone and was the control cell.

Cell B had a capacitance of 29.8788 picofarads and a cell constant, K($A/T$), of 328.7. It was filled with a dielectric solution comprised of Pyranol 1499 having dissolved therein 0.110 gram of block copolymer per 100 cc. of the solution. The block copolymer had a number average molecular weight of 53,300 and was comprised of 75 percent by weight polycarbonate having an average block length of 18.5 monomer units and 25 percent by weight of polydimethylsiloxane having an average block length of 20 monomer units.

Cell C had a capacitance of 30.1187 picofarads and a cell constant, K($A/G$), of 331.3. This cell was filled with a dielectric solution comprised of Pyranol 1499 having dissolved therein 0.080 gram of a block copolymer per 100 cc. of the solution. The block copolymer had a number average molecular weight of 72,000 and was comprised of 46 percent by weight polycarbonate having an average block length of 7.08 monomer units and 54 percent by weight of polydimethylsiloxane having an average block length of 20 monomer units. The percent dissipation factor of each of these three cells was determined under the same conditions as shown in Table I.

TABLE I

|  | Frequency (Hertz) | Percent dissipation factor At 23°C Initial | At 100°C | At 23°C Final |
|---|---|---|---|---|
| Cell A | 50 | 0.01513 | 0.3912 | 0.02366 |
|  | 100 | 0.00746 | 0.1954 | 0.01166 |
|  | 1000 | 0.000742 | 0.01956 | 0.001149 |
|  | 5000 | 0.000190 | 0.00392 | 0.000265 |
|  | 10,000 | 0.000170 | 0.00197 | 0.00021 |
| Cell B | 50 | 0.02876 | 0.3094 | 0.01449 |
|  | 100 | 0.001305 | 0.1543 | 0.00740 |
|  | 1000 | 0.001302 | 0.01542 | 0.000746 |
|  | 5000 | 0.000335 | 0.003096 | 0.000250 |
|  | 10,000 | 0.000290 | 0.001564 | 0.000290 |
| Cell C | 50 | 0.01748 | 0.1762 | 0.0092 |
|  | 100 | 0.00850 | 0.0947 | 0.00384 |
|  | 1000 | 0.000856 | 0.00988 | 0.000381 |
|  | 5000 | 0.000215 | 0.00181 | 0.000120 |
|  | 10,000 | 0.000190 | 0.00092 | 0.000140 |

Table I illustrates that there is no significant difference in the percent dissipation factor of Cells A, B and C when it is determined under the same conditions. The small differences in the values in Table I for Cells B and C, as compared to Cell A, are considered to be within experimental error in the art. Table I shows that the dielectric properties of the solutions of the present invention, as illustrated by their use in Cells B and C, are substantially the same as those of the dielectric liquid alone as shown by Cell A.

The resistivity of each of these cells was also determined by applying to each cell 500 volts D.C. for one minute. The results are shown in Table II.

TABLE II

|  | at 23°C Initial | Resistivity (ohms) At 100°C | At 23°C Final |
|---|---|---|---|
| Cell A | $9.03 \times 10^{11}$ | $3.25 \times 10^{11}$ | $1.01 \times 10^{12}$ |
| Cell B | $1.17 \times 10^{12}$ | $1.37 \times 10^{11}$ | $2.07 \times 10^{12}$ |
| Cell B | $8.28 \times 10^{10}$ | $7.19 \times 10^{11}$ | $2.05 \times 10^{12}$ |

Table II illustrates that there is no significant difference in the resistivity of the three cells when it is determined under the same conditions. The difference in the values of Table II for Cells B and C, as compared to Cell A, are considered to be within experimental error in the art. Table II further shows that the dielectric properties of the solutions of the present invention are substantially the same as those of the dielectric liquid alone.

Example 4

In this example, the dielectric properties of two dielectric solutions of the present invention were determined and compared to those of the dielectric liquid. Both solutions and the liquid had dissolved therein the same amount, i.e., 0.35 weigh percent, of diepoxycyclohexane. This diepoxycyclohexane is commonly used as a scavenger material in halogenated aromatic dielectric liquids to provide electrical capacitors with improved electrical properties.

Three standard electric cells were used and are herein referred to as cells A', B' and C'. Cell A' had a capacitance of 30.6309 picofarads and a cell constant, $K(^{A\prime}T)$, of 346.129. Cell A' was filled with Pyranol 1499 having dissolved therein the diepoxycyclohexane and was the control cell.

Cell B' had a capacitance of 30.2354 picofarads and a cell constant, $K(^{A\prime}T)$, of 341.772. It was filled with a dielectric solution comprised of the Pyranol 1499 having dissolved therein the diepoxycyclohexane and 0.110 gram of block copolymer per 100 cc. of the solution. The block copolymer had a number average molecular weight of 53,300 and was comprised of 75 percent by weight polycarbonate having an average block length of 18.5 monomer units and 25 percent by weight of polydimethylsiloxane having an average block length of 20 monomer units.

Cell C' had a capacitance of 28.8487 picofarads and a cell constant, $K(^{A\prime}T)$, of 325.990. This cell was filled with a dielectric solution comprised of Pyranol 1499 having dissolved therein the diepoxycyclohexane and 0.080 gram of a block copolymer per 100 cc. of the solution. The block copolymer had a number average molecular weight of 72,000 and was comprised of 46 percent by weight polycarbonate having an average block length of 7.08 monomer units and 54 percent by weight of polydimethylsiloxane having an average block length of 20 monomer units. The percent dissipation factor of each of these three cells was determined under the same conditions as shown in Table III.

TABLE III

|  | Frequency (Hertz) | Percent dissipation factor At 23°C Initial | At 100°C | At 23°C Final |
|---|---|---|---|---|
| Cell A' | 50 | 0.04320 | 0.411 | 0.02838 |
|  | 100 | 0.0190 | 0.250 | 0.01382 |
|  | 1000 | 0.00192 | 0.0206 | 0.001371 |
|  | 5000 | 0.00042 | 0.0041 | 0.000310 |
|  | 10,000 | 0.00028 | 0.00205 | 0.000230 |
| Cell B' | 50 | 0.05478 | 0.520 | 0.02560 |
|  | 100 | 0.02283 | 0.260 | 0.01201 |
|  | 1000 | 0.002283 | 0.0260 | 0.001192 |
|  | 5000 | 0.00049 | 0.0052 | 0.000280 |
|  | 10,000 | 0.00031 | 0.00259 | 0.00022 |
| Cell C' | 50 | 0.0688 | 0.704 | 0.03954 |
|  | 100 | 0.0353 | 0.352 | 0.01785 |
|  | 1000 | 0.003548 | 0.0352 | 0.001785 |
|  | 5000 | 0.000740 | 0.0070 | 0.000375 |
|  | 10,000 | 0.00044 | 0.0055 | 0.00027 |

Table III illustrates that there is no significant difference in the percent dissipation factor of Cells A', B' and C' when it is determined under the same conditions. The small differences in the values in Table III for Cells B' and C', as compared to Cell A', are considered to be within experimental error in the art. Specifically, Table III shows that the dielectric properties of the solutions of the present invention containing a scavenger material, as illustrated by their use in Cells B' and C', are substantially the same as those of the dielectric liquid alone with the same scavenger material, as shown by Cell A', and therefore, the present solutions have no significant effect on the scavenger material.

The resistivity of each of these cells was also determined by applying to each cell 500 volts D.C. for 1 minute. The results are shown in Table IV.

TABLE IV

|  | At 23°C Initial | Resistivity (ohms) At 100°C | At 23°C Final |
|---|---|---|---|
| Cell A' | $6.18 \times 10^{11}$ | $5.40 \times 10^{11}$ | $1.33 \times 10^{12}$ |
| Cell B' | $4.74 \times 10^{11}$ | $6.57 \times 10^{11}$ | $1.31 \times 10^{12}$ |
| Cell C' | $2.03 \times 10^{11}$ | $6.26 \times 10^{11}$ | $0.90 \times 10^{12}$ |

Table IV illustrates that there is no significant difference in the resistivity of the three cells when it is determined under the same conditions. The difference in the values of Table IV for Cells B' and C', as compared to Cell A', are considered to be within experimental error in the art. Table IV further shows that the dielectric properties of the solutions of the present invention containing a scavenger material are substantially the same as those of the dielectric liquid alone with the same scavenger material, and therefore, the present solutions have no significant effect on the scavenger material.

What is claimed is:

1. Electrical apparatus comprising in combination a container, an electrical device in said container, and a dielectric solution in said container with increased wetting properties and having a substantially uniform surface tension comprising a halogenated aromatic liquid having substantially dissolved therein a block copolymer additive which is surface-active in said liquid, said block copolymer additive being comprised of a first polymerized aromatic comonomer and a second polymerized organosiloxane or organofluoro comonomer, said first polymerized comonomer having an average block length of at least three monomer units being substantially soluble in said dielectric liquid and effective to distribute said additive therein, and said second polymerized comonomer having an average block length of at least five monomer units being sufficiently surface-active in said liquid to depress its surface tension at least two dynes per centimeter, and said dielectric liquid being comprised of an aromatic compound having from one to five chlorine substituents and from one to three aryl groups.

2. An electrical apparatus according to claim 1 wherein said block copolymer additive is a polycarbonate-polydimethylsiloxane block copolymer.

3. An electrical capacitor assembly comprising
   a. a housing;
   b. a capacitor element in said housing, said capacitor element comprising
      1. at least a pair of electrodes,
      2. a polyolefin film dielectric spacer between said electrodes,
   c. a dielectric solution with increased wetting properties and a substantially uniform surface tension in said housing and essentially completely impregnating said polyolefin;
   d. said dielectric solution comprising a halogenated aromatic dielectric liquid having substantially dissolved therein a block copolymer additive which is surface-active in said liquid, said block copolymer additive being comprised of a first polymerized aromatic comonomer and a second polymerized organosiloxane or organofluoro comonomer, said first polymerized comonomer having an average block length of at least three monomer units being substantially soluble in said dielectric liquid and effective to distribute said additive therein, and said second polymerized comonomer having an average block length of at least five monomer units being sufficiently surface-active in said liquid to depress its surface tension at least two dynes per centimeter, and said dielectric liquid being comprised of an aromatic compound having from one to five chlorine substituents and from one to three aryl groups.

4. The electrical capacitor according to claim 3 wherein said block copolymer additive is a polycarbonate-polydimethylsiloxane block copolymer.

5. The electrical capacitor according to claIM 4 wherein said block copolymer additive is present in an amount ranging from about 0.001 to 1 percent by weight of the dielectric liquid.

6. The electrical capacitor according to claim 4 wherein said polyolefin is polypropylene.

* * * * *